(12) United States Patent
Umemoto

(10) Patent No.: US 6,428,628 B1
(45) Date of Patent: Aug. 6, 2002

(54) PAINT-REMOVING METHOD, PAINT-REMOVING DEVICE, AND SHIP REMOVED OF PAINT

(76) Inventor: Masao Umemoto, 2-19-23-201, Mizonokuchi, Takatsu-ku, Kawasaki-shi, Kanagawa-ken 213-0001 (JP)

(*) Notice: Subject to any disclaimer, the term of this patent is extended or adjusted under 35 U.S.C. 154(b) by 0 days.

(21) Appl. No.: 09/642,884

(22) Filed: Aug. 22, 2000

(51) Int. Cl.$^7$ .............................................. C23D 17/00
(52) U.S. Cl. .................. 134/38; 134/1; 134/2; 134/19; 134/22.1; 134/22.11; 134/22.13; 134/22.14; 134/22.17; 134/22.19; 134/36; 134/42; 510/201; 510/202
(58) Field of Search .................. 134/2, 1, 19, 22.1, 134/22.11, 22.13, 22.14, 22.17, 22.19, 36, 38, 42; 510/201, 202

(56) References Cited

U.S. PATENT DOCUMENTS

| | | | |
|---|---|---|---|
| 5,256,210 A | * 10/1993 | Asakawa et al. | 134/38 |
| 5,346,640 A | * 9/1994 | Leys | 252/162 |
| 5,753,603 A | * 5/1998 | Lallier et al. | 510/212 |
| 6,040,284 A | * 3/2000 | Marquis et al. | 510/201 |
| 6,159,915 A | * 12/2000 | Machac, Jr. et al. | 510/201 |
| 6,174,847 B1 | * 1/2001 | Lallier et al. | 510/203 |
| 6,239,090 B1 | * 5/2001 | Marquis et al. | 510/201 |

* cited by examiner

Primary Examiner—Sharidan Carrillo
(74) Attorney, Agent, or Firm—Armstrong, Westerman & Hattori, LLP

(57) ABSTRACT

A paint-removing method comprises the steps of putting dimethyl sulfoxide into a tank, raising the dimethyl sulfoxide at a temperature of approximately 35° C. to 189° C. in the tank; and soaking a member to be removed of paint into the dimethyl sulfoxide in the tank. The dimethyl sulfoxide is applying or blowing to a member to be removed of paint.

11 Claims, 2 Drawing Sheets

PAINT-REMOVING METHOD, PAINT-REMOVING DEVICE, AND SHIP REMOVED OF PAINT

BACKGROUND OF THE INVENTION

1. Field of the Invention

The present invention relates to a paint-removing method, a paint-removing device, and a ship removed of paint.

2. Description of the Related Art

As a paint removing agent, methylene chloride, toluene, chlorotoluene, acetone, ethylene glycol alkyl ether, N-methyl pyrolidone, propylene glycol methyl ether, ethyl-3-etoxypropynate and the like are used.

As a solvent for diluting these paint-removing agents, mineral spirit, methanol, butanol, alkali allyl compounds and the like are used. These substances are mentioned in encyclopedia of Kirk-Othmer Chemical Technology, 17 Vol., 1069 (Wiley Inter Science Publication, New York, 1996). Because paint-removing agents are volatile, paraffin, amine, ethyl amine, sodium hydrate and the like are used to inhibit vaporization of the paint-removing agents.

All the paint-removing agents that have generally been employed are harmful to human bodies and to the environment. Moreover, except for methylene chloride, they cannot be used for powder-baking finish. Thus, there has been a demand for a paint-removing agent and a paint-removing method which are safe, widely applicable and highly effective.

SUMMARY OF THE INVENTION

It is thus an object of the present invention to provide a paint-removing method, a paint-removing device and a ship removed of paint by the paint-removing method, which are unharmful to human bodies and to the environment and have a good effect.

The inventors conducted a study of effective paint-removing agents. As a result, they have discovered that when dimethyl sulfoxide is raised at temperature ranging from approximately 35° C. to 189° C., preferably 40° C. to 100° C., the dimethyl sulfoxide demonstrates a great paint-removing capability.

In general, dimethyl sulfoxide has a solidification point of 19° C. In other words, a so-called room temperature is close to the solidification point of dimethyl sulfoxide. Dimethyl sulfoxide has the feature of completely lacking paint-removing capability nor paint-softening capability at a room temperature.

However, if dimethyl sulfoxide is raised the temperature above mentioned, its paint-removing capability is significantly enhanced. Its paint-removing capability is equal to or even higher than that of powerful methylene chloride. In addition, dimethyl sulfoxide is remarkably safe for human bodies and the environment.

A paint-removing method comprises the steps of putting dimethyl sulfoxide into a tank; raising said dimethyl sulfoxide at a temperature of approximately 35° C. to 189° C. in the tank; and soaking a member to be removed of paint into said dimethyl sulfoxide in the tank;

A paint-removing method comprises the steps of putting dimethyl sulfoxide into a tank; raising said dimethyl sulfoxide at a temperature of approximately 35° C. to 189° C.; in the tank; and applying or blowing said dimethyl sulfoxide to a member to be removed of paint.

A paint-removing method comprising the steps of raising dimethyl sulfoxide at a temperature of approximately 35° C. to 189° C.; and applying or blowing said dimethyl sulfoxide to a member to be removed of paint.

The paint-removing method further comprises raising or keeping said dimethyl sulfoxide at temperature of approximately 35° C. to 189° C.

A paint-removing method comprises the steps of raising dimethyl sulfoxide at a temperature of approximately 35° C. to 189° C.; applying or blowing said dimethyl sulfoxide to a member to be removed of paint; and penetrating said dimethyl sulfoxide into pin-holes of a member to be removed of paint.

The heating is performed by radio heating method of high-frequency vibration method.

The paint-removing method further comprises mixing dimethyl sulfoxide with one or more component(s) selected from paint-removing agent, abrasive substance, paint-softening agent, or thickener.

The paint-removing agent is N-methyl pyrrolidone.

The abrasive substance comprises one or more component(s) selected from diaton earth or calcium carbonate.

The paint-softening agent comprises one or more component(s) selected from acetic diethylene glycol monobutyl ether, acetic diethylene glycol ethyl ether, acetic ethylene glycol methyl ether, acetic propylene glycol methyl ether, acetic diethylene glycol alkyl ether, or diethylene glycol dimethyl ether.

The paint-softening agent comprises one or more component(s) selected from diethylene glycol diacetate or ethylene glycol diacetate.

The thickener comprises one or more component(s) selected from methyl cellulose, hydroxy cellulose or polyolefin glycol.

The dimethyl sulfoxide is further mixed with a glycol ether group or a glycol acetate group.

A paint coated on ship body is removed of paint by the paint-removing method.

A paint-removing device comprises a tank containing dimethyl sulfoxide; and heating device which is provided to the tank and which raises said dimethyl sulfoxide at a temperature of approximately 35° C. to 189° C.

A paint-removing device comprises a tank containing dimethyl sulfoxide; heating device which is provided to the tank and which raises said dimethyl sulfoxide at a temperature of approximately 35° C. to 189° C.; and an application/blowing device for applying or blowing said dimethyl sulfoxide to a member to be removed of paint.

A paint-removing device comprises heating device which raises dimethyl sulfoxide at a temperature of approximately 35° C. to 189° C.; and an application/blowing device for applying or blowing said dimethyl sulfoxide to a member to be removed of paint.

The paint-removing device further comprises device for raises or keeping said dimethyl sulfoxide at a temperature of approximately 35° C. to 189° C.

The heating device is provided with a pipe and/or the application/blowing device which said dimethyl sulfoxide flows.

The heating device is one selected from an electric heater, a flame burner, an infrared ray radiation device, a radio heating device or a high frequency vibration device.

The application/blowing device is a planar or bag-shaped brush.

The brush has an inner surface made from one of threads, non-woven fabric, sponge, or soft flexible rubber.

The inner surface of the brush is provided with a magnet and/or a suction cup.

The brush is provided with an upper liquid-dropping cylinder for causing said dimethyl sulfoxide to flow-down therethrough, an inclined receptacle cylinder for receiving the liquid.

DESCRIPTION OF THE PREFERRED EMBODIMENTS

Figure 1:
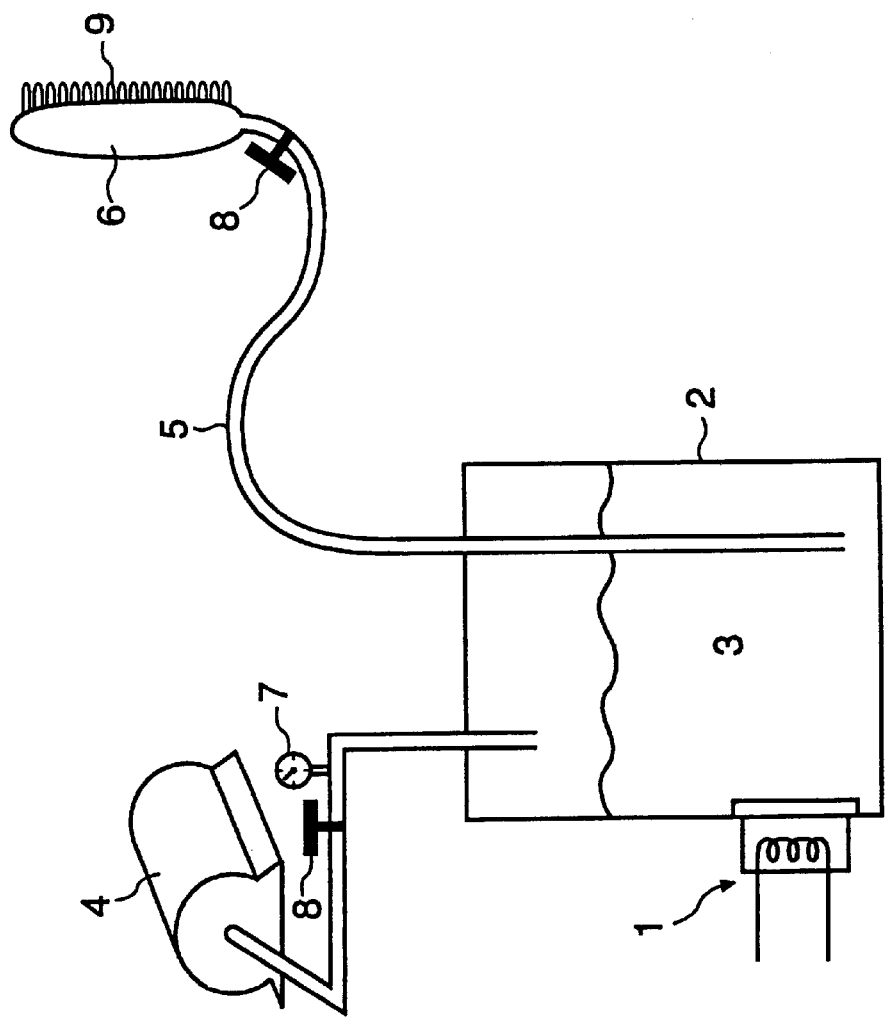
FIG. 1 schematically shows a paint-removing device in accordance with the present invention.

FIG. 1 schematically shows a paint-removing device in accordance with the present invention. In the Fig, a reference numeral 1 denotes a heating device. The heating device 1 is mounted to an outer periphery of a tank 2. Dimethyl sulfoxide is poured into tank 2. Tank 2 is heated by heating device as follows. The dimethyl sulfoxide in the tank 2 is raised by heating device at temperature ranging from approximately 35° C. to 189° C., preferably approximately 40° C. to 100° C. The control of maintaining the heating device at the temperature is performed either automatically with the aid of a thermostat, or manually through a switching operation with the aid of a thermometer.

The surface of dimethyl sulfoxide in the tank 2 is pressed by a pump 4 with pressure air at a predetermined pressure. Whereby, the dimethyl sulfoxide flows through a pipe 5 and is introduced to a brush 6 or a nozzle mounted to a tip end of the pipe 5. The air pressure is controlled by valve 8. The pressure is monitored with a pressure gage 7. The flow is stopped by a valve 8. The pump 4 may not be a so-called normal liquid transfer pump but a pump utilizing a pressure of compressed air. The pipe 5 needs to be movable and flexible.

The dimethyl sulfoxide is sent out by the pump 4 to the brush 6 that is mounted to the tip end of pipe 5. The dimethyl sulfoxide is applied to painted surface by means of the brush 6 or applicator as paint-removing device. The brush is most suited to remove paint from a large plane such as a wall surface.

In the way which the dimethyl sulfoxide is transferring to brush 6 through the pipe 5, the temperature of the dimethyl sulfoxide may lower under the predetermined temperature. Therefore, until the dimethyl sulfoxide begins to blow from the brush, the device for raising or keeping the dimethyl sulfoxide at temperature from approximately 35° C. to 189° C. may be prepared. For example, the heat device is provided the pipe, the brush or the nozzle.

In the methods of heating, there are methods of electric heating, burning flame heating, infrared ray radiation heating, radio heating including micro-wave radiation heating, high frequency vibration heating including super-sonic wave radiation heating and the like.

The frequency is ≧1 kHz, preferably ≧5 kHz.

Therefore, heating device is one selected from an electric heater, a flame burner, an infrared ray radiation device, a radio heating device or a high frequency vibration device.

And, the electric heating may be carried out with the tank having on its periphery around which Ni—Cr wires are wound. In the method of the burning flame heating, dimethyl sulfoxide needs to be fed into a metal pipe and heated from outside by flames.

And, when the supersonic wave irradiation or the high frequency vibration is applied to dimethyl sulfoxide, the temperature of dimethyl sulfoxide can be raised easily. A paint-removing capability is generated due to a rise in temperature of dimethyl sulfoxide. On the other hand, it has also been revealed that the temperature in most of substance other than dimethyl sulfoxide does not rise easily by the supersonic wave irradiation. Further, dimethyl sulfoxide in the tank need not be stirred in the case of a supersonic wave type. The supersonic wave is radiated from a lateral or lower portion of the tank.

Since it is only required that the temperature of dimethyl sulfoxide rise, there is no need to directly radiate supersonic wave into the tank. Also, dimethyl sulfoxide is raised at a portion other than the tank by radiation of supersonic wave, and the dimethyl sulfoxide may be sent out in the tank. An upper limit of the temperature of dimethyl sulfoxide is determined by setting an output of supersonic wave. In this case, the thermometer is not indispensable as in the case of the heating device.

The brush 6 is used to paint a wall surface with dimethyl sulfoxide that has effused. The brush 6 is formed with its entire surface or other periphery having hair-like threads, non-woven fabric, sponge, flexible rubber or the like. Alternatively, the brush 6 may be constructed with its inner surface having those materials and with its outer periphery covered with a strip of cloth so that dimethyl sulfoxide cannot leak outside easily.

Figure 2:
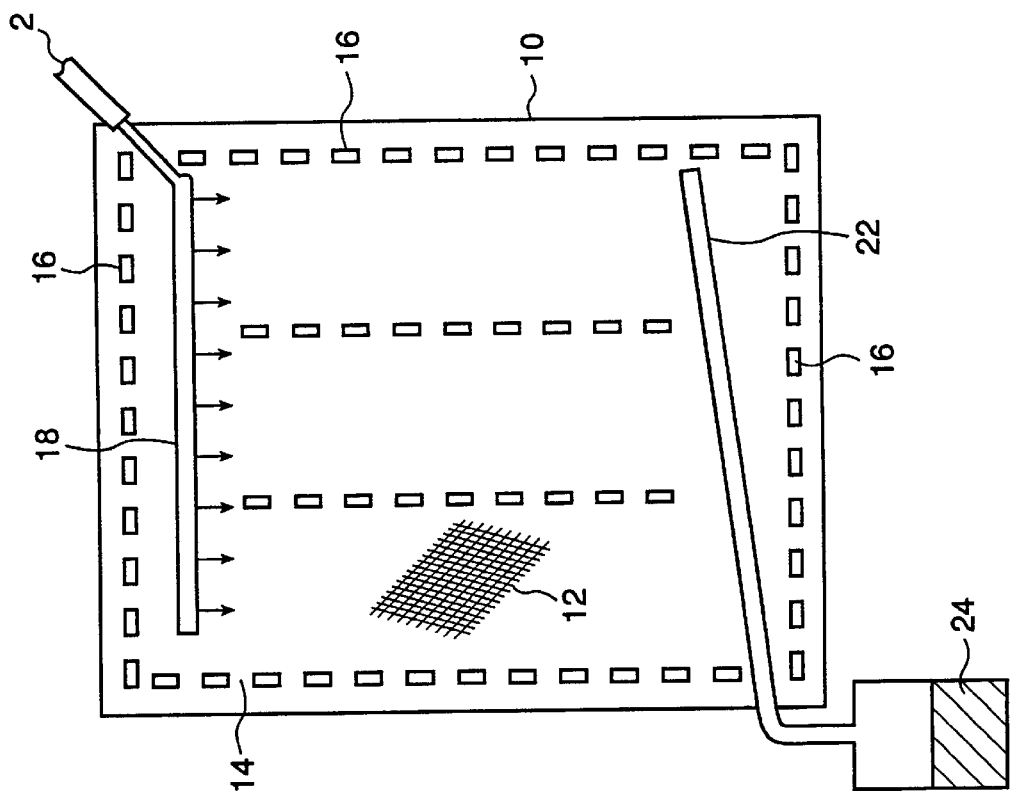
FIG. 2 schematically shows a brush used for the paint-removing device in accordance with the present invention.

FIG. 2 shows another construction of the brush. A brush 10 shown in FIG. 2 is constructed with a large surface. An inner surface 12 of the brush is made from threads, non-woven cloth or foamed polyurethane sponge in a thickness of, for example, 20 mm. An outer surface 14 of the brush is laminated, for example, with aluminum, polyethylene or the like so that dimethyl sulfoxide does not effuse outside.

Thus, vaporization of the dimethyl sulfoxide that has been raised is prevented. Also, since the painted surface is cold in winter, dimethyl sulfoxide falls in temperature to the extent of causing a decrease in paint-removing capability. However, the construction of the brush makes it possible to feed the dimethyl sulfoxide. Therefore, the dimethyl sulfoxide does not fall in temperature and thus can be used In this manner, after the inner surface of the brush has been brought into close contact with the painted surface, the outer periphery or the like of the brush is fixed to the painted surface. If the dimethyl sulfoxide is poured from above the brush, dimethyl sulfoxide penetrates into gaps in the threads, non-woven cloth, foamed polyurethane or the like. Then, the paint is removed after a while.

Also, the brush may be constructed with its inner surface having magnets 16. Hence, the brush can come into close contact with the entire painted surface made of iron. The magnets may be mounted not only along the outer periphery on the inner surface but in longitudinal or lateral lines. As the magnets, it is preferable to employ a polymer magnet such as a flexible magnet, for example, a rubber ferrite magnet. It is preferable to arrange a plurality of small magnets in length of several centimeters. The magnets are effective in performing a paint-removing operation of a ship which is constructed of iron components and which is to be removed of paint. In this case, the brush is mounted to a paint-removing robot to remove the paint from the ship in accordance with displacement of the robot.

In the case where the brush has a large surface, it is preferable to employ a strong magnet such as a neodymium magnet as the magnets. Also, the brush may be mounted to the painted surface by using screws or nails instead of magnets. Alternatively, in place of magnets, the brush may be provided with suction cups with their interior decompressed. This is also effective in performing a paint—removing operation of a ship. This construction is applicable to a non-metal component which is to be removed of paint. An upper liquid dropping cylinder 18 is disposed at an upper end of the brush. The dimethyl sulfoxide flows down through the threads, non-woven fabric or foamed polyurethane from a plurality of apertures 20 formed in the cylinder and drops off. An inclined groove 22 for collecting the dimethyl sulfoxide is provided at a lower end of the brush. The dimethyl sulfoxide flows through the groove and enters a collecting tank 24. The dimethyl sulfoxide in the collecting tank is returned to an original tank. Also, the brush may be constructed in the shape of a bag containing a painted component.

Also, the method for removing the paint by soaking a component to be removed of paint into dimethyl sulfoxide in tank can be considered. In this case, the tank may be installed separately from a heating portion.

When the painted component is put into a tank containing dimethyl sulfoxide, the component to be removed of paint may be thrown into the tank before a rise in temperature. Especially, the supersonic wave radiation efficiency deteriorates. Thus, it is preferable to throw the component into the tank after dimethyl sulfoxide has reached a set temperature.

The heating device of dimethyl sulfoxide may be provide the place as follows. The heat device is provided the pipe, the brush or the nozzle.

Dimethyl sulfoxide may be used as a single substance or may be mixed with one or more component(s) selected from paint-removing agent, abrasive substance; paint-softening agent, or thickener.

Dimethyl sulfoxide is mixed with a paint-removing agent. The paint-removing agent is N-methyl pyrrolidone.

Dimethyl sulfoxide is mixed with abrasive substance. The abrasive substance comprises one or more component(s) selected from diaton earth or calcium carbonate.

Dimethyl sulfoxide is mixed with thickener, so that dimethyl sulfoxide demonstrates viscosity and that methyl sulfoxide is inhibited from being vaporized through a raise in temperature. The thickener solved with dimethyl sulfoxide comprises one or more component(s) selected from hydroxy cellulose (hydroxypropyl) cellulose, hydroxyethyl cellulose, hydroxypropyl methylcellulose), methyl cellulose or polyolefin glycol. Methyl cellulose has a sufficient thickening effect in loadings of approximately 1 to 5%, without weakening the paint-removing effect.

In addition, it has been found out that polyethylene glycol and polypropylene glycol as well as, the above-mentioned methyl cellulose can be used as a substance which is soluble in the solution mixed a glycol ether group or a glycol acerate group with dimethyl sulfoxide, and provides viscosity. It is desirable that polyethylene glycol and polypropylene have a low molecular weight (200 to 1000). If they have a molecular weight equal to or higher than 2000, they are insoluble.

Even a paint-softening agent, which is not very effective as a single substance, can enhance a great paint-removing effect if mixed with dimethyl sulfoxide. Even when used at a room temperature, the above-mentioned solution provide a paint-removing capability for water-based paint, oil-based paint and the like except powder-baking paint. However, since the solution are mainly composed of dimethyl sulfoxide, their paint-removing capability is enhanced significantly through a raise in temperature. Thus, use of the aforementioned device will bring about better results.

As for a combination of paint-softening agents for enhancing the paint-removing capability, dimethyl sulfoxide may be combined with a glycol acetate group or a glycol ether group.

As a paint-softening agent for the glycol group, it is possible to use one or more component(s) selected from acetic diethylene glycol monobutyl ether, acetic diethylene glycol ethyl ether, acetic ethylene glycol methyl ether, acetic propylene glycol methyl ether, acetic diethylene glycol alkyl ether, acetic ethylene glycol alkyl ether, diethylene glycol dimethyl ether, diethylene glycol diacetate, or ethylene glycol diacetatek,.

Among these paint-softening agents, diethylene glycol diacetate and acetic diethylene glycol alkyl ether are relatively safe. On the other hand, ethylene glycol diacetate, acetic ethylene glycol alkyl ether and the like are poisonous.

The above-mentioned alkyl represents methyl, ethyl, propyl, butyl, hexyl and the like. Dialkyl includes two alkyls such as methyl ethyl.

Dimethyl sulfoxide provides a great penetration capability which enhances in accordance with a rise in temperature. Accordingly, it is possible to consider a mechanism wherein dimethyl sulfoxide penetrates into cracks or pinholes in the painted surface and removes paint therefrom. Use of a solution containing a paint-dissolving capability such as N-methyl pyrrolidone, a glycol acetate group and a glycol ether group creates a synergistic effect.

Embodiment 1

Dimethyl sulfoxide containing 100% raised at the temperature 45° C. was applied to a painted surface subjected to powder baking with a substance of epoxy-type or epoxy-polyester type. The paint was removed in 10 minutes in the former case, and in 20 minutes in the latter case.

Embodiment 2

Dimethyl sulfoxide raised at the temperature 25° C., 30° C. and 40° C. respectively were applied to a painted board subjected to powder baking with epoxy and were left as they were for 30 minutes. Then degrees of removal of the paint were compared with one another. As a result, the paint was not removed at all at 25° C., was not removed at 30° C. after the lapse of 10 minutes, was removed in a small amount after the lapse of 30 minutes, and was removed at 40° C. after the lapse of 10 minutes.

Embodiment 3

Dimethyl sulfoxide was put into the tank and raised at the temperature 50° C. Then, fragments of iron plates coated with melamine and urethane were soaked in the dimethyl sulfoxide to conduct a paint-removing test. It has been revealed that the paint was removed in 30 minutes in the former case and in 20 minutes in the latter case. As described above, the paint-removing capability of dimethyl sulfoxide according to the present invention is equivalent to that of a paint-removing agent with a high content of methylene chloride. The feature of the dimethyl sulfoxide consists in that the paint can be removed without again adhering to the painted surface even after dimethyl sulfoxide has been wiped off the painted surface. Because dimethyl sulfoxide does not dissolve the paint at all despite a great paint-removing capability, it can be used repeatedly. This is a truly remarkable effect.

Embodiment 4

Dimethyl sulfoxide or dimethyl sulfoxide mixed with 30% of acetic diethylene glycol alkyl ether was raised at the temperature 45° C., and a test was conducted using a thermosetting powder paint which was manufactured by Kubo-Takashi Paint Corporation for elastrostatic painting. Baking finish was carried out at Yasui Industry Limited. As a result of the test, it has been provided that all the powder paints of epoxy-type, epoxy-polyester type, and polyester type are removed in approximately 15 minutes. These powder-baking paints are generally difficult to remove unless a strong paint-removing agent with a high content of methylene chloride is used.

Embodiment 5

Diethylene glycol monobutyl ether mixed with dimethyl sulfoxide at the ratio of 1 to 4 was poured into a supersonic wave radiation bath (US100, 45 kHz) manufacture by GL Science Corporation. The painted surfaces subjected to powder baking according to the Embodiment 3 were soaked in the bath for 20 minutes. As a result, the paint was removed from both the painted surfaces. At this moment the temperature of the bath raised from 19° C. to 42° C. The supersonic wave itself does not have a paint-removing effect.

Embodiment 6

Methyl cellulose was dissolved into acetic diethylene glycol monobutyl ether mixed with dimethyl sulfoxide at the ratio of 1 to 4 or acetic diethylene glycol monobutyl ether mixed with dimethyl sulfoxide at the ratio of 1 to 2 so that methyl cellulose would comprise 4%. The solution was applied to painted surfaces painted in water-based paint, oil-based paint and oil paint. The painted surfaces were left as they were for several hours. The paints were easily removed by rubbing the painted surfaces.

Embodiment 7

A test for paint-removing capability was conducted using the paint-removing agent of the embodiment 4. As a result, the paint was removed at 45° C. after the lapse of 40 minutes from painted surfaces subjected to cationic electrodeposition, urethane painting, and melamine baking finish. However, the paint was not removed at all from a painted surface subjected to urethane ultraviolet painting.

Dimethyl sulfoxide mixed with diethylene glycol dimethyl ether at the ratio of 4 to 2 or 1 is prepared. Although diethylene glycol dimethyl ether demonstrates extremely low viscosity when used as a single substance, it demonstrates high viscosity when mixed with dimethyl sulfoxide. The diethylene glycol dimethyl ether remained adhered to the paint surfaces for a long time.

Embodiment 8

The paint was not removed at all from a painted surface coated with polymer. The paint was not removed from painted surfaces coated with polyolefin, nylon, polyester, urea resin, formalin resin, photo-setting resin and the like. Removal of the paint depends on the degree of coating. The dimethyl sulfoxide that has been raised has the effect of increasing a penetration capability. Therefore, if the resin that has been applied has pinholes, the paint is removed from the painted surfaces.

What is claimed is:

1. A paint-removing method comprising the steps of:
putting dimethyl sulfoxide into a tank;
raising said dimethyl sulfoxide at a temperature of approximately 40° C. to 100° C. in the tank, wherein raising the temperature is performed by radio heating or high frequency vibration at a frequency of $\geq 5$ kHz;
removing paint from a surface of a member by soaking said member having the painted surface with said dimethyl sulfoxide in said tank.

2. The paint-removing method according to claim 1, further comprising mixing dimethyl sulfoxide with one or more components selected from the group consisting of a paint-removing agent, an abrasive substance, a paint-softening agent, and a thickener.

3. The paint-removing method according to claim 2, wherein the paint-removing agent is N-methyl pyrrolidone.

4. The paint-removing method according to claim 2, wherein the abrasive substance comprises one or more components selected from the group consisting of diatom earth and calcium carbonate.

5. The paint-removing method according to claim 2, wherein the paint-softening agent comprises one or more components selected from the group of acetic diethylene glycol monobutyl ether, acetic diethylene glycol ethyl ether, acetic ethylene glycol methyl ether, acetic propylene glycol methyl ether, acetic diethylene glycol alkyl ether, and diethylene glycol dimethyl ether.

6. The paint-removing method according to claim 2, wherein the paint-softening agent comprises one or more components selected from the group consisting of diethylene glycol diacetate and ethylene glycol diacetate.

7. The paint-removing method according to claim 2, wherein the thickener comprises one or more components selected from the group consisting of methyl cellulose, hydroxy celluose, and polyolefin glycol.

8. The paint-removing method according to claim 2, wherein said dimethyl sulfoxide is further mixed with a glycol other or a glycol acetate.

9. A paint-removing method comprising the steps of:
putting dimethyl sulfoxide into a tank;
raising said dimethyl sulfoxide at a temperature of approximately 40° C. to 100° C. in the tank, wherein raising the temperature is performed by radio heating or high-frequency vibration at a frequency of $\geq 5$ kHz;
removing paint from a surface of a member by contacting the painted surface of said member with dimethyl sulfoxide or blowing said dimethyl sulfoxide unto the painted surface of said member.

10. A paint-removing method comprising the steps of:
raising dimethyl sulfoxide at a temperature of approximately 40° C. to 100° C., wherein raising the temperature is performed by radio heating of high-frequency vibration at a frequency of $\geq 5$ kHz;
removing paint from a surface of a member by contacting the painted surface of said member with dimethyl sulfoxide or blowing said dimethyl sulfoxide unto the painted surface of said member.

11. A paint-removing method comprising the steps of:
providing a member having a painted surface and pinholes therein;
raising dimethyl sulfoxide at a temperature of approximately 40° C. to 100° C.
wherein raising the temperature is performed by radio heating or high-frequency vibration at a frequency of $\geq 5$ kHz;
penetrating said pinholes of said member with dimethyl sulfoxide, wherein said penetrating step removes paint from said surface of said member.

* * * * *